(12) United States Patent
Daniel et al.

(10) Patent No.: US 10,563,742 B2
(45) Date of Patent: Feb. 18, 2020

(54) LINEAR ACTUATOR AND METHOD FOR ASSEMBLING AN ACTUATOR

(71) Applicant: Schaeffler Technologies AG & Co. KG, Herzogenaurach (DE)

(72) Inventors: Patrick Daniel, Kirkel (DE); Peter Heipt, St. Ingbert (DE)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 66 days.

(21) Appl. No.: 15/552,811

(22) PCT Filed: Mar. 2, 2016

(86) PCT No.: PCT/DE2016/200117
§ 371 (c)(1),
(2) Date: Aug. 23, 2017

(87) PCT Pub. No.: WO2016/141938
PCT Pub. Date: Sep. 15, 2016

(65) Prior Publication Data
US 2018/0038462 A1 Feb. 8, 2018

(30) Foreign Application Priority Data
Mar. 6, 2015 (DE) .......................... 10 2015 204 071

(51) Int. Cl.
*F16H 25/24* (2006.01)
*F16H 25/20* (2006.01)
(52) U.S. Cl.
CPC ......... *F16H 25/24* (2013.01); *F16H 25/2015* (2013.01); *F16H 2025/2034* (2013.01); *F16H 2025/2075* (2013.01)

(58) Field of Classification Search
CPC .. F16H 25/20; F16H 25/2418; F16H 25/2015; F16H 2025/2037; F16H 2025/2081; F16H 25/2009
(Continued)

(56) References Cited

U.S. PATENT DOCUMENTS 8,024,987 B2 * 9/2011 Yamaguchi ............. F16H 1/225
74/89.23
9,726,267 B2 * 8/2017 Range ................. F16H 25/2003
(Continued)

FOREIGN PATENT DOCUMENTS

CN 1308786 A 8/2001
DE 3733781 A1 * 4/1989 ............. F16H 25/20
(Continued)

OTHER PUBLICATIONS

Chinese Office Action from CN107429808; 8 pgs; dated Feb. 25, 2019 by Chinese Intellectual Property Office.

*Primary Examiner* — Jake Cook
*Assistant Examiner* — Gregory Robert Weber
(74) *Attorney, Agent, or Firm* — Antun M. Peakovic

(57) ABSTRACT

Linear actuators and methods for assembling the same are disclosed. A linear actuator according to the disclosure may include
a drive unit having a drive shaft and
a spindle mechanism having a spindle, which can be driven by the drive shaft.
A bearing unit may be provided, which may be configured to support a connecting shaft connecting the drive shaft to the spindle and has a bearing block matched to the internal cross section of the housing.
The bearing unit may have a preloading device for preloading a rotary bearing inserted into the bearing block, and the
(Continued)

spindle may be screwed to the connecting shaft via a centering portion and a screw fastening portion.

14 Claims, 1 Drawing Sheet

(58) Field of Classification Search
USPC .............................................. 74/89.37, 89.23
See application file for complete search history.

(56) References Cited

U.S. PATENT DOCUMENTS

| | | | | |
|---|---|---|---|---|
| 2011/0061481 A1* | 3/2011 | Zimmermann | ......... | F16H 25/24 |
| | | | | 74/89.23 |
| 2014/0174221 A1* | 6/2014 | Wu | .......... | H02K 7/06 |
| | | | | 74/89.23 |
| 2015/0047444 A1* | 2/2015 | Tsai | ........ | F16H 25/20 |
| | | | | 74/89.23 |
| 2015/0330497 A1* | 11/2015 | Amano | .................. | H02K 7/06 |
| | | | | 74/89.41 |

FOREIGN PATENT DOCUMENTS

| | | | |
|---|---|---|---|
| DE | 19843549 A1 | | 3/2000 |
| DE | 202010004265 U1 | | 8/2008 |
| DE | 102009011184 A1 | | 8/2010 |
| DE | 102013214733 A1 | | 1/2015 |
| JP | 2011120331 A | | 6/2011 |
| JP | 2012067771 | | 4/2012 |
| JP | 2015001258 A | * | 1/2015 |
| JP | 2015001258 A | | 1/2015 |

\* cited by examiner

LINEAR ACTUATOR AND METHOD FOR ASSEMBLING AN ACTUATOR

CROSS-REFERENCE TO RELATED APPLICATIONS

This application is the U.S. National Phase of PCT Appln. No. PCT/DE2016/200117 filed Mar. 2, 2016, which claims priority to 102015204071.2 filed Mar. 6, 2015, the entire disclosures of which are incorporated by reference herein.

TECHNICAL FIELD

The disclosure relates to linear actuators and methods of making the same.

BACKGROUND

A spindle drive having an integrated drive motor is known from DE 20 2010 004 265 U1, for example. A spindle drive of this kind can be used to adjust photovoltaic modules or parabolic antennae, for example. The spindle drive has a casing tube, which surrounds a spindle. A tubular connecting rod and a protective sleeve are connected to a spindle of the known spindle drive, wherein the protective sleeve can be moved axially on the casing tube. DE 20 2010 004 265 U1 does not contain any further details of the drive motor.

Another linear actuator with a motor drive is known from US 2011/0061481 A1, for example. Within this actuator there is a rolling bearing to support a spindle, said bearing being designed as a double-row ball bearing.

A linear actuator having a single-row ball bearing as a spindle bearing is also disclosed in JP 2012-067771 A. This actuator contains a reduction gear designed as a planetary transmission and is supposed to be capable of preventing rotary movements in any direction of rotation without a separate brake.

SUMMARY

An object of the disclosure may be to enhance a linear actuator in comparison with the known prior art, especially in respect of a favorable relationship between the installation space requirement, stability, functionality, mechanical precision and assembly effort.

According to the disclosure, this object may be achieved by an actuator having the features described herein and illustrated in the Figures. Advantages and embodiments explained below in the context of the assembly method also apply mutatis mutandis to the device, i.e. the actuator, and vice versa.

The actuator may have a column-shaped housing, such as a housing manufactured from a metal profile, in which a drive unit, in particular in the form of an electric motor, and a spindle mechanism are situated. The drive unit is coupled to the spindle mechanism by means of a connecting shaft, which is supported in a bearing unit, the cross section of which is matched to the internal cross section of the housing. The bearing unit comprises a bearing block, in which a rotary bearing, in particular a rolling bearing, is situated, and a preloading device for preloading the rotary bearing. The connecting shaft and the spindle are coupled in a precise manner to one another by centering contours, which may be situated directly on said parts and, in particular, can be designed as a pair comprising a cylindrical pin and an associated hole. In this arrangement, the connecting shaft may have a hole which receives a centering pin of the spindle. However, it would likewise also be possible for the end of the spindle facing the connecting shaft to be of hollow cylindrical design, wherein the connecting shaft has a pin-shaped centering portion which is inserted into the hollow end of the spindle. It is furthermore possible to configure both the end of the spindle and the end of the connecting shaft facing the spindle as hollow cylinders if there are centering portions on the two parts to be connected to one another. In all cases, the connecting shaft is screwed to the spindle.

In one embodiment, the preloading device is configured as a clamping nut, which is arranged on the end of the bearing block facing the spindle mechanism. On its outside, the clamping nut may be surrounded by a sleeve- or frame-shaped portion of the bearing block, while an encircling annular gap is formed between the clamping nut and the connecting shaft at the inner circumference of the clamping nut. In the case where the rotary bearing is designed as a rolling bearing, the clamping nut may strike against a bearing ring or a bearing disk of the rolling bearing. In the case where the rotary bearing is designed as a sliding bearing, the preloading device can be designed, for example, to impose a preloading force on a bearing shell.

A double-acting axial rolling bearing, such as an axial ball bearing, may be used as a rolling bearing to support the connecting shaft in the bearing block of the bearing unit. Here, a flange of the connecting shaft is situated between two rolling element rows, ensuring that forces in the axial direction of the bearing and hence also of the entire spindle mechanism can be transmitted between the bearing block and the connecting shaft, if required via the clamping nut. The two rolling element rows of a double-acting axial rolling bearing can roll either on respective bearing disks, which rest against the flange, or directly on the flange if said flange is designed as a rolling element race on both sides. It is also possible to use rollers or needles as rolling elements instead of balls. The rolling bearing supporting the connecting shaft can also be configured as a double-row angular-contact roller or ball bearing or as a single-row bearing, in particular a deep-groove ball bearing.

The spindle, which is screwed to the connecting shaft, can be secured by a locknut. Just like the clamping nut, the locknut may also be arranged on the end of the bearing block facing the spindle mechanism. By situating the locknut in a region radially to the inside of the clamping nut, it is possible to ensure that the clamping nut can still be actuated even after the tightening of the locknut.

In principle, known shaft connections may be suitable for the torque-transmitting connection between the drive shaft and the connecting shaft. For example, the drive shaft has an external profile which interacts positively with a corresponding internal profile of the hollow connecting shaft. A housing of the drive unit can be connected to the bearing block by means of a plurality of screws radially to the outside of this positive shaft connection.

The bearing unit may form two spaces within the housing of the actuator, and these may be separated from one another in a sealed manner. In addition to these two spaces, which may be arranged one behind the other in the axial direction of the actuator, there may be a third space spaced apart from the center line of the actuator, which extends along the entire housing. Components which are situated in the third space are connected by at least one line to electric components of the drive unit. The third space and the space in which the drive unit is situated are therefore referred to as subspaces of a single electrical-system space in the housing of the actuator. In contrast to the electrical-system space, there may be no parts supplied with electric power during operation as intended in the space in which the spindle mechanism is arranged. The space in which the spindle mechanism is arranged is also referred to as the mechanical-system space. The space in which the drive unit is arranged is also referred to as the main electrical-system space, and the additional space connected to the latter is also referred to as the secondary electrical-system space. In the secondary electrical-system space there may be at least one sensor-system component, in particular a component of a position detecting system, interacting both with the drive unit and with a component of the spindle mechanism.

The housing of the actuator can be produced cost-effectively as a metal profile. The outer surface of this metal profile may be ribbed, which on the one hand allows simple connection of additional components and, on the other hand, ensures improved heat dissipation in comparison with a smooth surface.

During the assembly of the actuator, the main electric and mechanical components, i.e. the drive unit, the bearing unit and the spindle mechanism, may be pre-assembled so that they can then be inserted as a complete modular unit into the housing. Components which are to be mounted in the secondary electrical-system space, in particular sensor-system components, can be installed separately if required.

More specifically, the assembly of the actuator may comprise the following steps:

A column-shaped housing is provided.

A bearing unit, in which a hollow connecting shaft having a screw fastening portion and a centering portion is supported, is provided.

A drive unit having a drive shaft is screwed to the bearing unit to establish a torque-transmitting connection between the drive shaft and the connecting shaft.

A spindle of a spindle mechanism, the end of which is designed as a centering pin that corresponds to the centering portion of the connecting shaft, is screwed to the connecting shaft.

The preassembled arrangement comprising the drive unit, the bearing unit and the spindle mechanism is inserted as a whole into the housing and secured therein.

Here, steps 3 and 4 can be carried out in any desired sequence. For repair and maintenance purposes, the actuator can simply be disassembled in a similar manner. Covers, preferably manufactured from plastic, which close off the interior of the housing, may be situated at the ends of the housing.

The interior of the housing may be divided into a plurality of mutually separate spaces by at least one seal, such as by at least one static and one dynamic seal. The spaces are an "electrical-system chamber" and a "mechanical-system chamber". Conducting components of the linear actuator, which can include an electric drive as well as components of the data processing system and line, may be arranged exclusively in the first space, i.e. the electrical-system chamber of the actuator. At least one Hall-effect sensor can be arranged in the electrical-system chamber, for example, as a sensor for recording angular positions and/or rotary movements.

A spindle mechanism, together with the associated bearing arrangement, may be situated in the second space, i.e. the mechanical-system chamber. The spindle mechanism can be designed as a ball screw, as a simple motion-transmitting thread or as a rolling-contact planetary transmission, for example. A rolling bearing, such as an axial ball bearing, axial roller bearing or axial needle bearing providing support in both axial directions, may be provided to support the spindle of the spindle mechanism, this bearing being arranged within the mechanical-system chamber. In one embodiment, this is the bearing of the connecting shaft, which is connected firmly to the spindle.

The electric motor which drives the spindle can either have its own bearing arrangement or be designed as a direct drive with a rotor without its own bearing arrangement. In the latter case, the rotor of the electric motor is connected rigidly to the spindle of the spindle mechanism by means of the connecting shaft while, in the first case, a compensating coupling is optionally inserted between the electric motor and the spindle. In both cases, the rotor of the electric motor is arranged within the electrical-system chamber separated from the mechanical-system chamber in a sealed manner. In contrast to the bearing arrangement described, which is designed as an axial rolling bearing, a sliding bearing arrangement may be provided to support a tubular connecting rod that can be moved by means of the associated spindle nut and extended out of the housing. Here, a sliding bearing element inserted into the housing can directly adjoin a cover which closes off the housing at the end and is dynamically sealed with respect to the tubular connecting rod.

In one embodiment, a continuous housing wall, which may be formed by a metal profile, surrounds both the electrical-system chamber and the mechanical-system chamber of the actuator. Apart from covers at the ends, the housing of the actuator is of integral construction. The end covers can be manufactured from metal, e.g. from steel sheet or from a metallic material subject to primary forming and/or machining, or from plastic.

The housing of the actuator is supported in a connection structure which allows it to be tilted, for example. For this purpose, there can be bearing journals on the housing which form components of a sliding bearing arrangement. Depending on the dimensioning and application, it is likewise possible to install the housing of the actuator rigidly in a connection structure. In both cases, a connecting thread, e.g. for a joint eye for pivotable connection to another design element, e.g. a pivotable frame or a link rod, can be situated at the end of the connecting rod of the spindle mechanism.

The actuator drive motor situated in the electrical-system chamber can be combined with a transmission to form a geared motor. The transmission is a planetary transmission, for example, allowing coaxial arrangement of the drive motor and the spindle mechanism and hence, overall, a slim design of the actuator. Both in the case of embodiments with direct electrical drive of the spindle and in the case of embodiments with an interposed transmission, a shaft duct between the electrical-system chamber and the mechanical-system chamber may be the only point at which the electrical-system chamber has to be sealed not only statically but also dynamically.

In another embodiment, all the components of the actuator which are situated in the electrical-system chamber are of maintenance-free design. Accordingly, there is a lubricating connection or a plurality of lubricating connections at most in the second space of the actuator. By virtue of the fact that at least one component of the spindle mechanism, such as a tubular connecting rod, can be extended out of the mechanical-system chamber of the actuator, the air-filled volume within the mechanical-system chamber is variable. An air admission and release device for the mechanical-system chamber can comprise a diaphragm or a double diaphragm valve, for example. The air admission and release device can be integrated into a cover, in particular a plastic cover, which closes off the housing at the end, wherein it is spaced apart radially from the component which can be extended out of the mechanical-system chamber, i.e. the connecting rod, of the actuator and is thus arranged asymmetrically with respect to the spindle mechanism.

In one embodiment, there is no comparable air release device on the electrical-system chamber of the actuator. The dynamic seal between the electrical-system chamber and the mechanical-system chamber allows slight pressure differences between the two chambers of, for example, up to a few millibars.

The actuator housing, which may be manufactured as continuously cast profile or extruded profile, in particular from a light metal alloy, may have not only external profiling but also internal contours, which can be used to attach various components. There can, for example, be connection contours in the form of a centering receptacle for a limit switch, and a receptacle for a circuit board within the electrical-system chamber. Countersunk screws conforming to DIN 605, for example, are suitable for fixing by means of such receptacles and connection contours, in particular with T slots.

The continuously cast profile or extruded profile of the actuator may have precisely two nonoverlapping cross-sectional regions, wherein the first cross-sectional region contains two cavities, namely the first subspace of the electrical-system space, that accommodating the electric motor, and the mechanical-system chamber, while the second cross-sectional region may contain only the second subspace of the electrical-system space, i.e. the subspace in which no electric motor but at least one sensor-system component is arranged. The main electrical-system space is arranged as a first subspace as a linear extension of the spindle mechanism, while the second subspace, namely the secondary electrical-system space, extends over the majority of the length of the housing, e.g. over more than 80% or more than 90% of the length of the housing, parallel to the center line of the spindle mechanism. A housing partition wall extending parallel to the center line of the spindle mechanism delimits the second subspace both with respect to the first subspace and with respect to the mechanical-system chamber. The secondary electrical-system space can also contain, for example, the complete sensor system for a linear, incremental or absolute measuring system designed to detect the position and/or movement of the connecting rod of the actuator. As an option, the sensor system is part of a path control system of the actuator.

One benefit of the disclosure lies especially in that a linear actuator can be assembled in a cost-effective manner from a preassembled modular unit, which comprises a spindle mechanism together with the associated preloaded bearing arrangement and drive unit, and a housing which is configured as a metal profile. There may be no need for a compensating coupling between the drive unit and the spindle mechanism.

The actuator is suitable especially for use outdoors, e.g. as a component for adjusting a solar module, but also for mobile applications, e.g. in road or rail vehicles.

BRIEF DESCRIPTION OF THE DRAWINGS

An illustrative embodiment of the disclosure is explained in greater detail below by means of a drawing, in which.

DETAILED DESCRIPTION

Figure 1:
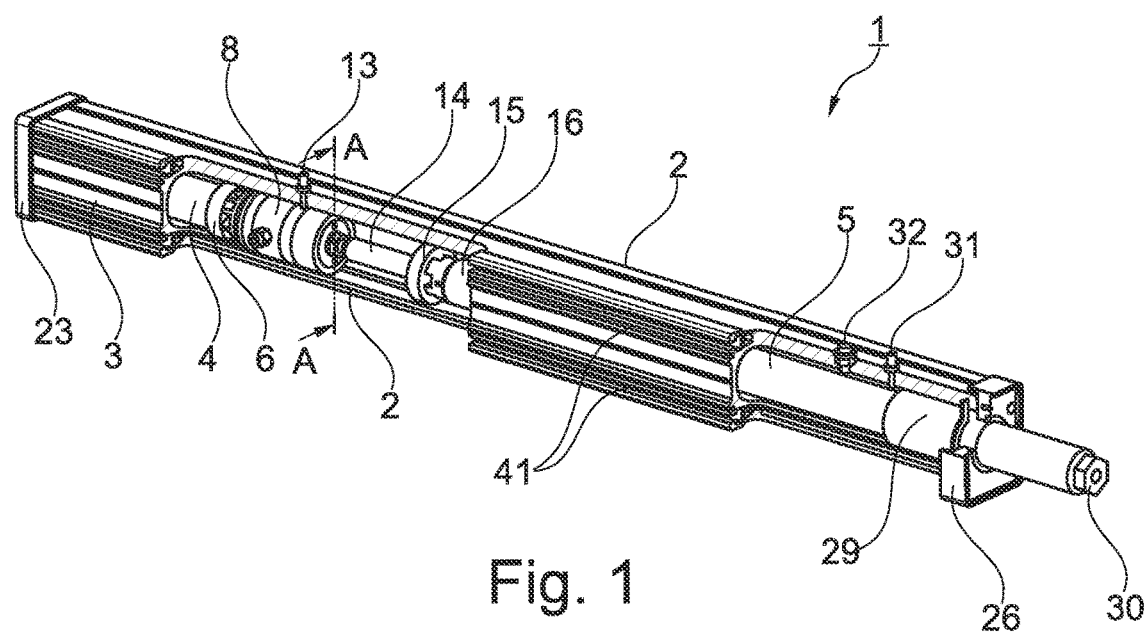
FIG. 1 shows a linear actuator in section, according to an embodiment.

The figures show an electrically operated linear actuator, denoted overall by the reference sign 1, in respect of the basic functioning of which attention is drawn to the prior art cited at the outset.

The actuator 1 has a housing 2 having a continuous housing wall 3, which is formed by a metal profile and extends approximately over the entire length of the actuator 1. Situated within the housing 2 are two mutually separated spaces 4, 5, namely an electrical-system chamber 4, also referred to as the first space, and a mechanical-system chamber 5, also referred to as the second space. Conducting components, including an electric motor 6, are accommodated in the electrical-system chamber 4. A spindle mechanism 7 driven by the electric motor 6 is situated in the mechanical-system chamber 5.

A bearing unit 8, which is sealed off with respect to the housing wall 3 by a static seal 9, is arranged in the housing 2 at the interface between the electrical-system chamber 4 and the mechanical-system chamber 5. The bearing unit 8 is penetrated by a connecting shaft 10, which connects the electric motor 6 to the spindle mechanism 7 and is sealed off with respect to the bearing unit 8 by a dynamic seal 11. The connecting shaft 10 is supported in the bearing unit 8 by means of a rolling bearing, namely a double-row axial ball bearing 12. The dynamic seal 11 is directly adjacent to the double-row axial ball bearing 12, wherein it is arranged on the side of the double-row axial ball bearing 12 facing the electrical-system chamber 4, and therefore the double-row axial ball bearing 12 is situated within the mechanical-system chamber 5. For relubrication of the double-row axial ball bearing 12, a lubricant feed 13 in the form of a lubricating nipple is provided. When viewed in the axial direction of the spindle mechanism 7, the lubricant feed 13 is situated between the two rolling element rows of the axial ball bearing 12.

In contrast, there may be no re-lubrication of components within the electrical-system chamber 4. The spindle mechanism 7 comprises a spindle 14, which is firmly connected to the connecting shaft 10, and a spindle nut 15. A jacket tube 16, also referred to as a tubular connecting rod, which represents a component of the spindle mechanism 7 which can be extended out of the housing 2, is connected to the spindle nut 15.

The electrical-system space 4 is subdivided into two subspaces 17, 18, namely a main electrical-system space 17 and a secondary electrical-system space 18. The main electrical-system space 17, which is also referred to as an upper electrical-system space without restricting generality, has the same cross section as the mechanical-system space 5 and—when viewed in the axial direction of the spindle mechanism 7—is mounted ahead of the mechanical-system space 5. In contrast, the secondary electrical-system space 18, which is also referred to as the lower electrical-system space, extends over the entire length of the housing 2. A limit switch 19, referred to in general terms as a sensor-system component, which is arranged in the secondary electrical-system space 18, is designed as a contactless inductive sensor and interacts with the spindle nut 15 or a part connected firmly to the spindle nut 15.

Associated electric lines are likewise laid in the secondary electrical-system space 18. At the end of the actuator 1 at which the electric motor 6 is situated, the main electrical-system space 17 is connected to the secondary electrical-system space 18 by a cable penetration (not visible in the figures). The cable penetration is situated in a partition wall 22 which separates the secondary electrical-system space 18 both from the mechanical-system space 5 and from the main electrical-system space 17. Like the housing wall 3, the partition wall 22 is formed directly from the metal profile from which the housing 2 is produced.

A cover 23 closes off the electrical-system space 4 at the motor end of the actuator 1. At the end of the actuator 1 at which the jacket tube 16, also referred to as the tubular connecting rod, projects from the housing 2, the housing 2 is closed by a cover 26, wherein the jacket tube 16 is sealed off with respect to cover 26 by seals (not shown). Cover 26 closes off both the mechanical-system chamber 5 and the secondary electrical-system space 18. To guide the jacket tube 16, a sliding bearing element 29, which interacts directly with the jacket tube 16, is provided at the end of the housing 2 which is closed with the aid of cover 26. At its end projecting from the housing 2, the jacket tube 16 is closed by a connection element 30, to which a joint eye can be connected, for example. For re-lubrication of the spindle mechanism 7, a lubricant feed 31 is provided in the region of the sliding bearing element 29, said feed being designed in a manner corresponding to the lubricant feed 13 on the rolling bearing 12 and penetrating the housing 2 and the sliding bearing element 29. The sliding bearing element 29 directly adjoins cover 26. To admit and release air to and from the mechanical-system chamber 5, an air admission and release device, referred to as ventilation element 32 for short, is integrated into cover 26.

Figure 2:
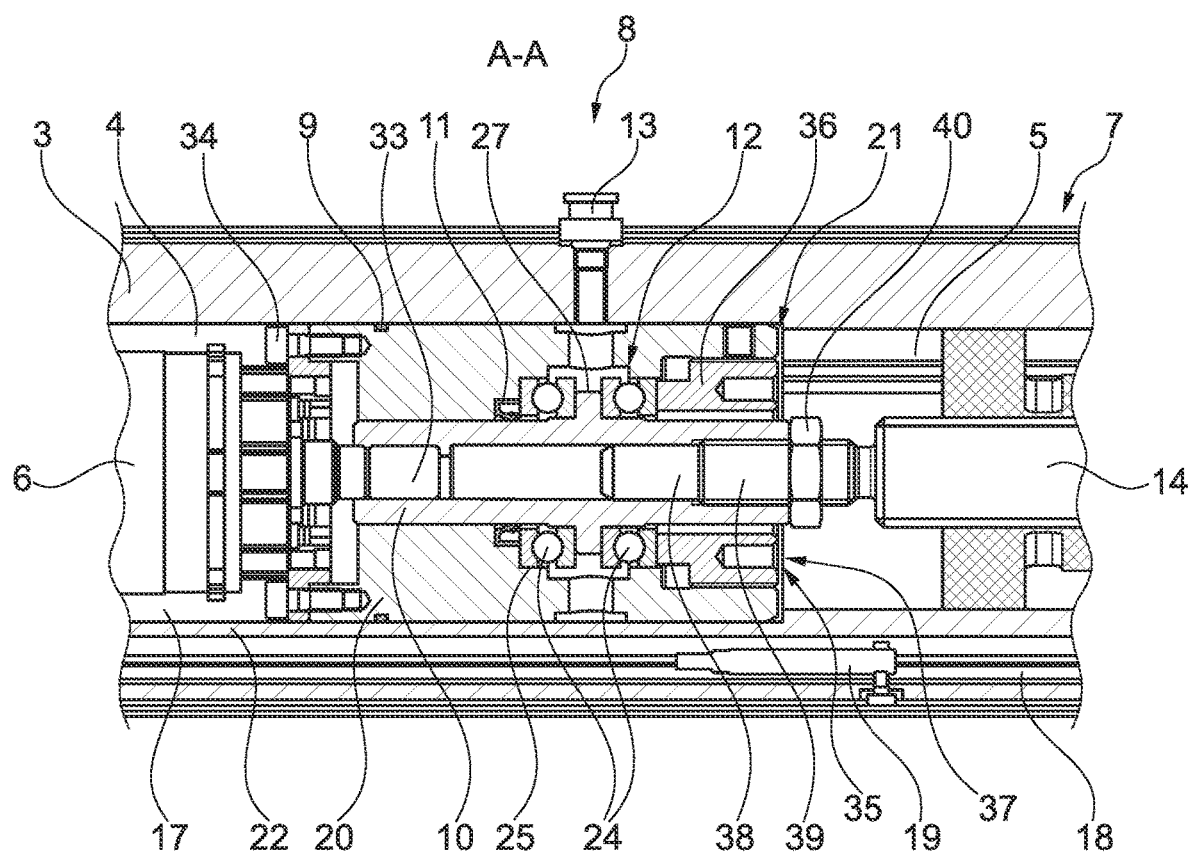
FIG. 2 shows a detail of the actuator in section.

The bearing unit 8 has a plurality of components, which are integrated into a bearing block 20 and are explained in greater detail below. The cross section of the bearing block 20 is matched to the internal cross section of the housing 2 in the region of the electrical-system chamber 4. A step 21, against which the bearing block 20 rests, is formed in the interior of the housing 2, between the electrical-system chamber 4 and the mechanical-system chamber 5. Two rows of rolling elements 24 and a total of four bearing disks 25 can be seen in FIG. 2 as components of the rolling bearing 12. In this arrangement, the two inner bearing disks 25 rest against a flange 27, which is an integral part of the connecting shaft 10.

On the same side as the electric motor 6, also referred to in general terms as the drive unit, a drive shaft denoted by 33, which is identical to or firmly connected to the motor shaft of the electric motor 6, projects positively into the connecting shaft 10. The drive unit 6 overall is secured on the bearing block 20 by means of fastening screws 34.

At the opposite end of the bearing block 20, that facing the spindle mechanism 7, a preloading device 35 is installed in said bearing block. By means of an annular clamping nut 36 placed around the connecting shaft 10 while maintaining a gap, the preloading device 35 makes it possible to set the preloading of the rolling bearing 12. In this arrangement, the clamping nut 36 rests directly against one of the bearing disks 25. Actuating contours 37 designed as end-face recesses allow the adjustment of the clamping nut 36, even when the spindle mechanism 7 is already firmly connected to the bearing unit 8.

The spindle 14 is centered in the hollow connecting shaft 10, wherein a pin-shaped centering portion of the spindle 14 is denoted by 38. Adjacent to the centering portion 38, the spindle 14 has a screw fastening portion 39, by means of which the spindle 14 is screwed into the connecting shaft 10. The terms "centering portion" and "screw fastening portion" are also used for the corresponding portions 38, 39 of the connecting shaft 10. In addition, a locknut 40 is screwed onto the spindle 14 in order to secure the screwed joint between the spindle 14 and the connecting shaft 10. The outside diameter of the locknut 40 is no greater than the inside diameter of the clamping nut 36.

By virtue of the arrangement of the electric motor 6 as a rectilinear extension of the spindle mechanism 7 and the use of a continuous, integral housing 2, the actuator 1 overall has a particularly slim and, at the same time, robust construction. An outer surface, denoted by 41, of the housing 2 is ribbed, thus providing, on the one hand, the effect of cooling ribs and, on the other hand, a simple possibility for the connection of other components.

LIST OF REFERENCE SIGNS 1 actuator
2 housing
3 housing wall
4 first space, electrical-system chamber
5 second space, mechanical-system chamber
6 electric motor, drive unit
7 spindle mechanism
8 bearing unit
9 static seal
10 connecting shaft
11 dynamic seal
12 rolling bearing, double-row axial ball bearing
13 lubricant feed
14 spindle
15 spindle nut
16 jacket tube
17 subspace, main electrical-system space
18 subspace, secondary electrical-system space
19 limit switch, sensor-system component
20 bearing block
21 step
22 partition wall
23 cover
24 rolling element
25 bearing disk
26 cover
27 flange
28
29 sliding bearing element
30 connection element
31 lubricant feed
32 ventilation element
33 drive shaft
34 fastening screw
35 preloading device
36 clamping nut
37 actuating contour
38 centering portion
39 screw fastening portion
40 locknut
41 outer surface

The invention claimed is:
1. A linear actuator comprising:
a housing having an internal cross section;
a drive unit having a drive shaft;
a spindle mechanism having a spindle; and
a bearing unit configured to support a connecting shaft, the bearing unit having a bearing block with an outer cross section matched to the internal cross section of the housing, the connecting shaft connecting the drive shaft to the spindle;
wherein the bearing unit has a preloading device for axially preloading a rotary bearing inserted into the bearing block, and the spindle is screwed to the connecting shaft via a centering portion and a screw fastening portion;

wherein the preloading device has a clamping nut, which is concentric with the connection shaft and surrounds the connecting shaft;

wherein a locknut, which is screwed onto the spindle, subjects the bearing block to a force in an axial direction of the spindle, secures the spindle on the connecting shaft and has an outside diameter no greater than an inside diameter of the clamping nut.

2. The actuator as claimed in claim 1, wherein the rotary bearing is configured as a double row axial rolling bearing.

3. The actuator as claimed in claim 2, wherein two bearing races of the double row axial rolling bearing are supported on a flange of the connecting shaft.

4. The actuator as claimed in claim 1, wherein a static seal and a dynamic seal of the bearing unit separate a first space in the housing, in which the drive unit is situated, from a second space in the housing, in which the spindle mechanism is situated.

5. The actuator as claimed in claim 4, wherein the first space includes two non-overlapping subspaces, wherein one of the subspaces is spaced apart from a center line of the spindle mechanism, and extends over an entire length of the housing.

6. The actuator as claimed in claim 5, wherein at least one sensor-system component interacting both with the drive unit and with the spindle mechanism is arranged in the subspace spaced apart from the center line of the spindle mechanism.

7. The actuator as claimed in claim 1, wherein the housing has a ribbed outer surface.

8. A linear actuator, comprising:
a drive unit having a drive shaft;
a spindle mechanism having a spindle; and
a bearing unit having a bearing block having an external cross section matched to an internal cross section of a housing, the bearing unit configured to support a connecting shaft, the connecting shaft connecting the drive shaft to the spindle;

wherein the bearing unit has a preloading device including a clamping nut, the clamping nut concentric with and surrounding the connecting shaft, the preloading device configured to axially preload a rotary bearing inserted into the bearing block, and wherein the spindle is attached to the connecting shaft via a centering portion and a screw fastening portion wherein a locknut, which is screwed onto the spindle, subjects the bearing block to a force in an axial direction of the spindle, secures the spindle on the connecting shaft and has an outside diameter no greater than an inside diameter of the clamping nut.

9. The actuator as claimed in claim 8, wherein the rotary bearing is configured as a double row axial rolling bearing.

10. The actuator as claimed in claim 9, wherein two bearing races of the double row axial rolling bearing are supported on a flange of the connecting shaft.

11. The actuator as claimed in claim 8, wherein a static seal and a dynamic seal of the bearing unit separate a first space in the housing, in which the drive unit is situated, from a second space in the housing, in which the spindle mechanism is situated.

12. The actuator as claimed in claim 11, wherein the first space includes two non-overlapping subspaces, wherein one of the subspaces, which is spaced apart from a center line of the spindle mechanism, extends over an entire length of the housing.

13. The actuator as claimed in claim 12, wherein at least one sensor-system component interacting both with the drive unit and with the spindle mechanism is arranged in the subspace spaced apart from the center line of the spindle mechanism.

14. The actuator as claimed in claim 8, wherein the housing has a ribbed outer surface.

\* \* \* \* \*